(12) United States Patent
Lee (10) Patent No.: US 12,552,739 B2
(45) Date of Patent: Feb. 17, 2026

(54) METHOD FOR PREPARING PRIMARY AMIDE COMPOUNDS FROM SECONDARY OR TERTIARY AMIDES

(71) Applicant: INDUSTRY FOUNDATION OF CHONNAM NATIONAL UNIVERSITY, Gwangju (KR)

(72) Inventor: Sun Woo Lee, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 573 days.

(21) Appl. No.: 18/007,911

(22) PCT Filed: Feb. 2, 2021

(86) PCT No.: PCT/KR2021/001340
§ 371 (c)(1),
(2) Date: Dec. 2, 2022

(87) PCT Pub. No.: WO2021/246611
PCT Pub. Date: Dec. 9, 2021

(65) Prior Publication Data
US 2023/0234913 A1    Jul. 27, 2023

(30) Foreign Application Priority Data
Jun. 4, 2020 (KR) .................. 10-2020-0067900

(51) Int. Cl.
*C07C 231/08* (2006.01)

(52) U.S. Cl.
CPC ................. *C07C 231/08* (2013.01)

(58) Field of Classification Search
CPC ... C07C 231/08; C07C 233/65; C07C 235/44; C07C 237/30; C07C 253/30; C07C 255/57; C07C 201/12; C07C 205/58; C07C 235/84; C07C 269/06; C07C 271/28; C07C 233/11; C07C 233/10; C07C 233/05
USPC .......................................................... 564/183
See application file for complete search history.

(56) References Cited

PUBLICATIONS

Stephenson, N. A., et al.; "Ammonolysis of anilides promoted by ethylene glycol and phosphoric acid", RSC Adv., 2014, 4, 46840-46843.
Liu, Y., et al.; "Transamidation of N-acyl-glutarimides with amines", Org. Biomol. Chem., 2018, 16, 1322-1329.
Szostak, R., et al.; "Ground-State Distortion in N?Acyl-tert-butyl-carbamates (Boc) and N?Acyl-tosylamides (Ts): Twisted Amides of Relevance to Amide N?C Cross-Coupling", J. Org. Chem., 2016, pp. 1-4.
Hassan, G. S., et al.; "Synthesis and Biological Evaluation of Some Substituted-2-N-(5-chloro-2-methoxy-4-methylphenylsulphonyl) Glutamic Acid Derivatives against Prostate Cancer Cell Line PC3", Chem. Pharm. Bull. 61(2) 212-221 (2013).
Sureshbabu, P., et al.; "tert-Butyl nitrite promoted transamidation of secondary amides under metal and catalyst free conditions", Org. Biomol. Chem., 2019, 17, 845.
Chen, J., et al.; "Transamidation for the Synthesis of Primary Amides at Room Temperature", Org. Lett. 2020, 22, 3504-3508.
International Search Report from corresponding PCT Application No. PCT/KR2021/001340, dated Sep. 8, 2021.

*Primary Examiner* — Ana Z Muresan
(74) *Attorney, Agent, or Firm* — Harness, Dickey & Pierce, P.L.C.

(57) ABSTRACT

The present invention relates to a method for preparing primary amides from tertiary or secondary amides substituted with various alkyl groups through a transamidation reaction without a metal catalyst in room-temperature conditions by adding ammonium carbonate ($(NH_4)_2CO_3$), wherein the method is eco-friendly since various secondary and tertiary amides that are not toxic or corrosive are used as starting materials and ammonium carbonate ($(NH_4)_2CO_3$) that is neither a strong acid nor a strong base is used, and the method is economical since various primary amides can be synthesized with an excellent yield at room temperature without a metal catalyst.

11 Claims, 3 Drawing Sheets

METHOD FOR PREPARING PRIMARY AMIDE COMPOUNDS FROM SECONDARY OR TERTIARY AMIDES

CROSS-REFERENCE TO RELATED APPLICATIONS

This application is a national phase application of PCT Application No. PCT/KR2021/001340, filed on Feb. 2, 2021, which claims the benefit and priority to Korean Patent Application No. 10-2020-0067900, filed on Jun. 4, 2020. The entire disclosures of the applications identified in this paragraph are incorporated herein by references.

TECHNICAL FIELD

The present disclosure has been made with the support of the Ministry of Science and ICT of the Republic of Korea under Project No. 2017R1A2B2002929, which was conducted by Chonnam National University in the research program named "Development of useful precursor synthesis method using propionic acid" as a branch of the research project titled "Personal Basic Research (Ministry of Science and ICT) (R&D)", under the research management of the National Research Foundation of Korea, from Mar. 1, 2019 to Feb. 29, 2020.

The present disclosure relates to a method for preparing primary amides and, specifically, to a method for preparation of primary amides from tertiary or secondary amides having various alkyl substituents through transamidation with ammonium carbonate [$(NH_4)_2CO_3$] in a room temperature condition without using a metal catalyst.

BACKGROUND ART

An amide is one of the important functional groups in chemistry, biology, and materials engineering. Amides are used as key structural units in the manufacturing process of engineering plastics, lubricants, fertilizers, detergents, natural products, proteins, peptides, and pharmaceuticals.

Among others, primary amides can be easily converted to other amides, nitriles, primary amines, or oxazoles, and since they are units found in many medicines, many studies have been conducted on their usefulness. In particular, primary benzamides have been found to account for units of pharmaceuticals such as salicylamide, frovatriptan, niraparib, and labetalol. Hence, extensive studies have been conducted to develop a method for synthesizing various primary amides.

Conventionally, advantage is taken of the amidation of carboxylic acid derivatives including halides, esters, or anhydrides with ammonia or the hydration of nitriles for preparing primary amides. However, the starting materials for the amidation of carboxylic acid derivatives with ammonia are toxic and corrosive while the hydration of nitriles requires a strong acid or a strong base that may cause hydrolysis of the synthesized primary amides.

To solve the problems, development has been made of various methods including the use of an activator for converting a carboxylic acid into an amide, the hydration of nitrile in the presence of a metal catalyst, the rearrangement of aldoxime, the aminocarboxylation of aryl halides in the presence of a palladium catalyst, the C—C bond cleavage of ethyl arene, the decarboxylative ammoxidation of phenyl acetate, the oxidation of primary benzylamines, and the oxidative amidation of aldehydes.

Transamidation refers to the conversion of one amide to another and has recently received a lot of attention. A number of catalyst systems using transition metals have been developed and are being used for the transformation of various amides. Recently, metal systems have been reported that provide transamidation products at good yields. In addition, a transamidation reaction for converting a primary amide to a secondary or tertiary amide has been reported. However, the reaction of converting the secondary or tertiary amide to the primary amide as a starting material has not been reported so far.

DISCLOSURE OF INVENTION

Technical Problem

Accordingly, the present inventors tried to find a method for preparing a primary amide in the absence of a strong acid or a strong base in the reaction from a starting material that is neither toxic nor corrosive.

Surprisingly, the present inventors achieved an invention pertaining to a method by which various primary amides can be prepared at room temperature using ammonium carbonate [$(NH_4)_2CO_3$], which is neither a strong acid nor a strong base, even in the absence of a metal catalyst, with various secondary and tertiary amides serving as starting materials.

An aspect of the present disclosure is to provide a method for preparing a primary amide, the method including a step of:

subjecting a secondary or tertiary amide as a substrate to transamidation with an ammonia source in the absence of a catalyst.

Another aspect of the present disclosure is to provide a method for preparing a primary benzamide, the method including a step of:

subjecting N-phenyl-N-tosyl benzamide as a substrate to transamidation with an ammonia source in the absence of a catalyst.

A further aspect of the present disclosure is to provide a method for preparing a primary benzamide, the method including a step of:

subjecting substituted N-phenyl-N-tosyl benzamide as a substrate to transamidation with an ammonia source in the absence of a catalyst.

Herein, the substituted N-phenyl-N-tosyl benzamide is at least one selected from the group consisting of N-4-methoxyphenyl N-tosyl benzamide, N-4-fluorophenyl N-tosyl benzamide, N-benzyl N-tosyl benzamide, N-methyl N-tosyl benzamide, N-trifluoromethane sulfonyl N-phenyl benzamide, N-mesityl N-phenyl benzamide, N-Boc N-phenyl benzamide, N-benzoyl saccharin, N-benzoyl succinimide, N-benzoyl glutarimide, N-methyl N-phenyl benzamide, and N, N-diphenyl benzamide.

Yet another aspect of the present disclosure is to provide a method for preparing a primary benzamide, the method including a step of:

subjecting substituted N-phenyl-N-tosyl benzamide as a substrate to transamidation with an ammonia source in a solvent in the absence of a catalyst.

Solution to Problem

The present disclosure is drawn to a method for preparing a primary amide from a tertiary or secondary amide and, more specifically, to a method for preparation of primary amides from tertiary or secondary amides substituted with various alkyl groups through transamidation with ammonium carbonate [(NH$_4$)$_2$CO$_3$] in the absence of a metal catalyst in a room-temperature.

Below, a detailed description will be given of the present disclosure.

Leading to the present disclosure, intensive and thorough research conducted by the present inventors into the preparation of primary amides without using a strong acid and a strong base resulted in finding a method for preparing a primary amide from a secondary or tertiary amide as a starting material.

An aspect of the present disclosure is drawn to a method for preparing a primary amide, the method including a step of:

subjecting a secondary or tertiary amide as a substrate to transamidation with an ammonia source in a solvent without using a catalyst.

In the present disclosure, the primary amide is a compound represented by the following Chemical Formula 1:

[Chemical Formula 1]

wherein R is selected from the group consisting of aryl radicals and alkyl radicals.

Figure 1:
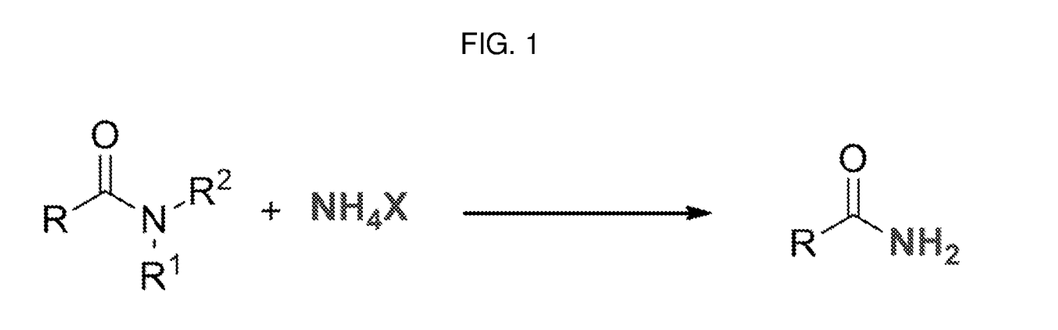
FIG. 1 is a reaction scheme of synthesizing a benzamide from N-phenyl-N-tosyl benzamide according to an embodiment of the present disclosure.

In the present disclosure, the method for preparation of a primary amide from a secondary or tertiary amide as a substrate may be carried out as illustrated in the reaction scheme of FIG. 1.

In the present disclosure, the secondary or tertiary amide may be represented by the following Chemical Formula 2:

[Chemical Formula 2]

wherein, R1 and R2 may each be independently a functional radical selected from the group consisting of N-phenyl, N-tosyl, N-4-methyl, N-4-methoxyphenyl, N-fluorophenyl, N-benzyl, N-trifluoromethanesulfonyl, N-mesityl, N-Boc (N-tert-butoxycarbonyl), N-benzoyl saccharin, N-benzoyl succinimide, N-benzoyl glutarimide, N-methyl N-phenyl, N, N-diphenyl, and hydrogen, and may be linked to each other to form a ring, but with no limitations thereto.

In the present disclosure, the functional radical may further include at least one selected from the group consisting of methyl, tert-butyl, phenyl, naphthyl, acetyl, methoxy, dimethoxy, dimethylamino, carbamoyl, tosyl, silyl, furan, one or more halogen functional radicals, acetyl, cyano, nitro, tert-butoxycarbonyl (Boc), tert-butyldimethylchlorosilane (TBS), and furan, but with no limitations thereto.

In the present disclosure, the ammonia source may be at least one selected from the group consisting of ammonium chloride (NH4Cl), ammonium tetrafluoroborate (NH4BF4), ammonium acetate (NH4OAc), and ammonium carbonate ((NH$_4$)$_2$CO$_3$), for example, ammonium carbonate ((NH$_4$)$_2$CO$_3$), but is not limited thereto.

In the present disclosure, when ammonium chloride (NH$_4$OAc) is used as an ammonia source, at least one selected from the group consisting of DBU (1,8-diazabicy-clo[5.4.0]undec-7-ene), trisodium phosphate (Na$_3$PO$_4$), and sodium carbonate (Na$_2$CO$_3$) may be further added as an additional base. For example, sodium carbonate (Na$_2$CO$_3$) may be further added, but with no limitations thereto.

In the present disclosure, the solvent may be at least one selected from the group consisting of dimethyl sulfoxide (DMSO), N, N-dimethylformamide (DMF), tetrahydrofuran (THF), ethanol (EtOH), toluene, and dichloromethane (DCM), for example, DMSO, but with no limitations thereto.

As used herein, the term "transamidation" refers to a chemical reaction in which an amide reacts with an amine to generate a new amide. In general, since the reaction proceeds very slowly, the reaction rate can be improved by a metal catalyst.

The method for preparing a primary amide according to the present disclosure is characterized by performing transamidation in the absence of a catalyst, for example, a metal catalyst.

Another aspect of the present disclosure is drawn to a method for preparing benzamide, the method comprising a step of:

subjecting N-phenyl-N-tosyl benzamide as a substrate to transamidation with an ammonia source in a solvent without using a catalyst.

In the present disclosure, N-phenyl-N-tosyl benzamide and the ammonia source may be used at an equivalent ratio of 5:2 to 5:11, 5:2 to 5:8, 5:2 to 5:6, or 5:2 to 5:3, for example, 5:3, but with no limitations thereto.

In the present disclosure, the method for preparing benzamide from N-phenyl-N-tosyl benzamide may be performed in a temperature condition of 20 to 45° C., 20 to 43° C., 20 to 40° C., 23 to 45° C., 23 to 43° C., 23 to 40° C., 25 to 45° C., 25 to 43° C., or 25 to 40° C., for example, 25 to 40° C., but with no limitations thereto.

In the present disclosure, the method for preparing benzamide from N-phenyl-N-tosyl benzamide may be performed for 4 to 18 hours, 4 to 16 hours, 6 to 18 hours, or 6 to 16 hours, for example, 6 to 16 hours, but with no limitations thereto.

In an embodiment of the present disclosure, the method for preparing a primary amide from substituted N-phenyl-N-tosyl benzamide may be performed according to the conditions for substrates, reaction temperatures, and reaction times shown in Table 1, below.

Another aspect of the present disclosure is drawn to a method for preparing a primary amide, the method including a step of:

subjecting substituted N-phenyl-N-tosyl benzamide as a substrate to transamidation with an ammonia source in a solvent without using a catalyst.

In the present disclosure, the substituted N-phenyl-N-tosyl benzamide may be one selected from the group consisting of 2-methyl-N-phenyl-N-tosylbenzamide, 3-methyl-N-phenyl-N-tosylbenzamide, 4-methyl-N-phenyl-N-tosylbenzamide, 4-(tert-butyl)-N-phenyl-N-tosylbenzamide, N-phenyl-N-tosyl-[1,1-biphenyl]-4-carboxamide, N-phenyl-N-tosyl-1-naphthamide), N-phenyl-N-tosyl-2-naphthamide, 2-methoxy-N-phenyl-N-tosylbenzamide, 3-methoxy-N-phenyl-N-tosylbenzamide, 4-methoxy-N-phenyl-N-tosylbenzamide, 3,4-dimethoxy-N-phenyl-N-tosylbenzamide, 3-(dimethylamino)-N-phenyl-N-tosylbenzamide, 4-(dimethylamino)-N-phenyl-N-tosylbenzamide, 2-fluoro-N-phenyl-N-tosylbenzamide, 3-fluoro-N-phenyl-N-tosylbenzamide, 4-fluoro-N-phenyl-N-tosylbenzamide, 2-chloro-N-phenyl-N-tosylbenzamide, trichloro-N-phenyl-N-tosylbenzamide, 2-bromo-N-phenyl-N-tosylbenzamide, 2-iodo-N-phenyl-N-tosylbenzamide, 3-iodo-N-phenyl-N-tosylbenzamide, 4-iodo-N-phenyl-N-tosylbenzamide, 4-cyano-N-phenyl-N-tosylbenzamide, 2-nitro-N-phenyl-N-tosylbenzamide, 4-nitro-N-phenyl-N-tosylbenzamide, methyl 4-(phenyl(tosyl)carbamoyl)benzoate, 4-acetyl-N-phenyl-N-tosylbenzamide, 4-amino-N-phenyl-N-tosylbenzamide, tert-butyl (4-(phenyl(tosyl)carbamoyl)phenyl)carbamate, 4-[bis[(1,1-dimethylethoxy)carbonyl]amino]-N-phenyl-N-tosylbenzamide, tert-butyl (4-(phenyl(tosyl)carbamoyl)phenyl)carbonate, 4-((tert-butyldimethylsilyl)oxy)-N-phenyl-N-tosylbenzamide, 3-((tert-butyldimethylsilyl)oxy)-N-phenyl-N-tosylbenzamide, N-phenyl-N-tosylfuran-3-carboxamide, N-phenyl-N-tosylfuran-2-carboxamide, N-phenyl-N-tosylpicolinamide, N-phenyl-N-tosylisonicotinamide, N-phenyl-N-tosylcinnamamide, N,2-diphenyl-N-tosylacetamide, 2-(naphthalen-1-yl)-N-phenyl-N-tosylacetamide, N-phenyl-N-tosylpentanamide, N-phenyl-N-tosylcyclohexanecarboxamide, and N-phenyl-N-tosyladamantane-1-carboxamide, with preference for 3-methyl-N-phenyl-N-tosylbenzamide, 4-methyl-N-phenyl-N-tosylbenzamide, 4-(tert-butyl)-N-phenyl-N-tosylbenzamide, N-phenyl-N-tosyl-1-naphthamide, 3-methoxy-N-phenyl-N-tosylbenzamide, 3,4-dimethoxy-N-phenyl-N-tosylbenzamide, 3-(dimethylamino)-N-phenyl-N-tosylbenzamide, 2-fluoro-N-phenyl-N-tosylbenzamide, 3-fluoro-N-phenyl-N-tosylbenzamide, 4-fluoro-N-phenyl-N-tosylbenzamide, 3-iodo-N-phenyl-N-tosylbenzamide, 4-iodo-N-phenyl-N-tosylbenzamide, 4-cyano-N-phenyl-N-tosylbenzamide, 2-nitro-N-phenyl-N-tosylbenzamide, 4-nitro-N-phenyl-N-tosylbenzamide, methyl 4-(phenyl(tosyl)carbomoyl)benzoate, 4-acetyl-N-phenyl-N-tosylbenzamide, tert-butyl(4-(phenyl(tosyl)carbomoyl)phenyl)carbamate, 4-[bis [(1,1-dimethylethoxy)carbonyl]amino]-N-phenyl-tosylbenzamide, N-phenyl-N-tosylfuran-3-carboxamide, N-phenyl-N-tosylfuran-2-carboxamide, N-phenyl-N-tosyl picolinamide, N-phenyl-N-tosyl isonicotinamide, N-phenyl-N-tosyl cinnamamide, N,2-diphenyl-N-tosyl acetamide, 2-(naphthalen-1-yl)-N-phenyl-N-tosyl acetamide, or N-phenyl-N-tosyl cyclohexane carboxamide, but is not limited thereto.

In the present disclosure, the method for preparing a primary amide from substituted N-phenyl-N-tosyl benzamide may be carried out in the temperature condition of 20 to 45° C., 20 to 43° C., 20 to 40° C., 23 to 45° C., 23 to 43° C., 23 to 40° C., 25 to 45° C., 25 to 43° C., or 25 to 40° C., for example, 25 to 40° C., but with no limitations thereto.

In the present disclosure, the method for preparing a primary amide from substituted N-phenyl-N-tosyl benzamide may be carried out for 4 to 140 hours, 4 to 130 hours, 4 to 120 hours, 6 to 140 hours, 6 to 130 hours, or 6 to 120 hours, for example, 6 to 120 hours, but with no limitations thereto.

In an embodiment of the present disclosure, the method for preparing a primary amide from substituted N-phenyl-N-tosyl benzamide may be carried out according to the conditions for substrates, reaction temperatures, and reaction times shown in Table 2, below.

Another aspect of the present disclosure is drawn to a method for preparing benzamide, the method including a step of:

subjecting a substrate to transamidation with an ammonia source in a solvent without using a catalyst, the substrate being selected from the group consisting of N-4-methoxyphenyl N-tosyl benzamide, N-4-fluorophenyl N-tosyl benzamide, N-benzyl N-tosyl benzamide, N-methyl N-tosyl benzamide, N-trifluoromethanesulfonyl N-phenyl benzamide, N-mesityl N-phenyl benzamide, N-Boc protected N-phenyl benzamide, N-benzoyl saccharin, N-benzoyl succinimide, N-benzoyl glutarimide, N-methyl N-phenyl benzamide, and N,N-diphenyl benzamide.

In an embodiment of the present disclosure, the method for preparing a primary benzamide from one selected from the group consisting of N-4-methoxyphenyl N-tosyl benzamide, N-4-fluorophenyl N-tosyl benzamide, N-benzyl N-tosyl benzamide, N-methyl N-tosyl benzamide, N-trifluoromethanesulfonyl N-phenyl benzamide, N-mesityl N-phenyl benzamide, N-Boc protected N-phenyl benzamide, N-benzoyl saccharin, N-benzoyl succinimide, N-benzoyl glutarimide, N-methyl N-phenyl benzamide, and N,N-diphenyl benzamide may be carried out according to the conditions for substrates, reaction temperatures, and reaction times shown in Table 3, below.

Another aspect of the present disclosure is drawn to a method for preparing a benzamide, the method including a step of:

subjecting a substrate to transamidation with an ammonia source in a solvent without using a catalyst, the substrate being selected from the group consisting of 1-tosyl pyrrolidin-2-one, 1-tosyl piperidin-2-one, and 1-tosyl azepan-2-one.

The method for preparing a primary benzamide from one selected from the group consisting of 1-tosyl pyrrolidin-2-one, 1-tosyl piperidin-2-one, and 1-tosyl azepan-2-one may be carried out according to the conditions for substrates, reaction temperatures, and reaction times shown in Table 4, below.

The step of subjecting a substrate to transamidation, the substrate being selected from the group consisting of 1-tosyl pyrrolidin-2-one, 1-tosyl piperidin-2-one, and 1-tosyl azepan-2-one, may be carried out for 14 to 38 hours, 14 to 36 hours, 16 to 38 hours, or 16 to 36 hours, for example, 16 to 36 hours, but with no limitations thereto.

The step of subjecting a substrate to transamidation, the substrate being selected from the group consisting of 1-tosyl pyrrolidin-2-one, 1-tosyl piperidin-2-one, and 1-tosyl azepan-2-one, may be carried out according to the conditions for substrates, reaction temperatures, and reaction times shown in Table 4, below.

The step of subjecting a substrate to transamidation, the substrate being selected from the group consisting of 1-tosyl pyrrolidin-2-one, 1-tosyl piperidin-2-one, and 1-tosyl azepan-2-one, may be carried out for 16 hours in a temperature condition of 40° C. in the absence of a catalyst, with ammonium carbonate $[(NH_4)_2CO_3]$ used at 0.5 equivalents as the ammonia source.

The step of subjecting a substrate to transamidation, the substrate being selected from the group consisting of 1-tosyl pyrrolidin-2-one, 1-tosyl piperidin-2-one, and 1-tosyl azepan-2-one, may be carried out for 36 hours in a temperature condition of 40° C. in the absence of a catalyst, with ammonium carbonate $[(NH_4)_2CO_3]$ used at 1.0 equivalent as the ammonia source.

Advantageous Effects of Invention

The present disclosure pertains to a method for preparing a primary amide from a secondary or tertiary amide as a starting material. According to the present disclosure, various primary amides can be prepared in an eco-friendly manner in which various secondary and tertiary amides that are not toxic or corrosive are used as starting materials and react with ammonium carbonate $[(NH_4)_2CO_3]$, which is neither a strong acid nor a strong base. Furthermore, the method can synthesize various primary amides with high yield even in the absence of a catalyst at room temperature and is adapted to conduct a synthesis reaction in a single step, thus enabling the economically beneficial production of various primary amides.

BEST MODE FOR CARRYING OUT THE INVENTION

The present disclosure pertains to a method for preparing a primary amide, the method including a step of:

subjecting a secondary or tertiary amide as a substrate to transamidation with an ammonia source without using a catalyst.

MODE FOR CARRYING OUT THE INVENTION

Hereinafter, the present disclosure will be described in further detail with reference to the following Examples and the accompanying drawings. It will be obvious to a person skilled in the art that the Examples are for illustrative purposes only and are not to be construed to limit the scope of the present disclosure.

Example 1. Synthesis of Benzamide from N-Phenyl-N-Tosyl Benzamide

Figure 2:
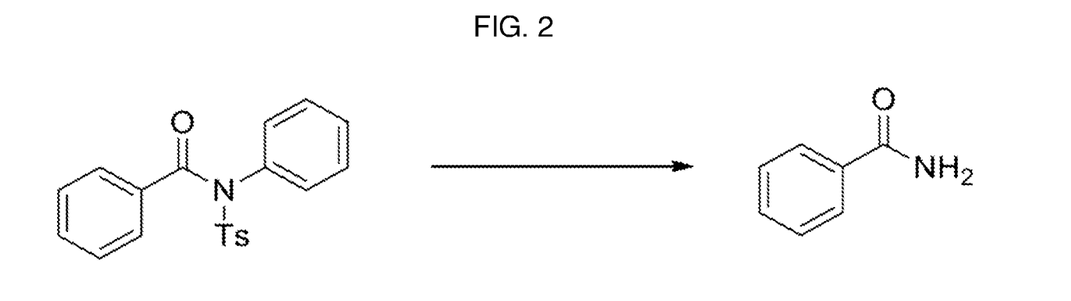
FIG. 2 is a reaction scheme of synthesizing a benzamide from N-phenyl-N-tosyl benzamide according to an embodiment of the present disclosure.

To find out optimal ammonia sources for the synthesis of a primary benzamide, a synthesis reaction was carried out using various ammonia sources in various solvents, with N-phenyl-N-tosyl benzamide serving as a reaction substrate, as illustrated in the reaction scheme of FIG. 2, to afford as a product the primary benzamide represented by the following Chemical Formula 3:

[Chemical Formula 3]

Used in the synthesis reaction were 0.2 mmol of N-phenyl-N-tosyl benzamide as a reaction substrate, 0.4 mmol of ammonium chloride, ammonium tetrafluoroborate, ammonium acetate, ammonium formate, or ammonium carbonate as an ammonia source, 0.2 mmol of DBU (1,8-diazabicyclo [5.4.0]undec-7-ene), trisodium phosphate, or sodium carbonate as an additional base, 1.0 mL of dimethyl sulfoxide (DMSO), N,N-dimethylformamide (DMF), tetrahydrofuran (THF), ethanol (EtOH), toluene, or dichloromethane (DCM) as a solvent in the combinations listed in Table 1. The synthesis reaction was carried out at 25° C. for 6 hours.

The yields of the products were measured by gas chromatography-mass spectrometry (GCMS) and are summarized as % in Table 1.

Chromatography and 1H NMR measured as follows: Mp: 127-128° C.; 1H NMR (500 MHz, DMSO-d6) δ 7.99 (s, 1H), 7.90-7.84 (m, 2H), 7.55-7.49 (m, 1H), 7.48-7.42 (m, 2H), 7.38 (s, 1H); 13C NMR (126 MHz, DMSO-d6) δ 168.3, 134.7, 131.7, 128.7, 127.9.

TABLE 1

| No. | Ammonia source | Base | Solvent | Yield (%) |
|---|---|---|---|---|
| 1 | NH$_4$Cl | — | DMSO | 0 |
| 2 | NH$_4$BF$_4$ | — | DMSO | 0 |
| 3 | NH$_4$OAc | — | DMSO | 66 |
| 4 | NH$_4$OAc | DBU | DMSO | 73 |
| 5 | NH$_4$OAc | Na$_3$PO$_4$ | DMSO | 90 |
| 6 | NH$_4$OAc | Na$_2$CO$_3$ | DMSO | 94 |
| 7 | (NH$_4$)$_2$CO$_3$ | — | DMSO | 77 |
| 8 | (NH$_4$)$_2$CO$_3$ | — | DMSO | 99 |
| 9 | (NH$_4$)$_2$CO$_3$ | — | DMF | 83 |
| 10 | (NH$_4$)$_2$CO$_3$ | — | THF | 27 |
| 11 | (NH$_4$)$_2$CO$_3$ | — | EtOH | 23 |
| 12 | (NH$_4$)$_2$CO$_3$ | — | Toluene | 0 |
| 13 | (NH$_4$)$_2$CO$_3$ | — | DCM | 0 |
| 14 | (NH$_4$)$_2$CO$_3$ | — | DMSO | 99 (92) |

As can be seen in Table 1, the reaction between ammonium chloride (NH$_4$Cl) and ammonium tetrafluoroborate (NH$_4$BF$_4$) in dimethyl sulfoxide at 25° C. did not afford any product (Nos. 1 and 2).

The product was obtained at a yield of 66% when ammonium acetate (NH$_4$OAc) was used as an ammonia source (No. 3). The employment of ammonium acetate (NH$_4$OAc) increased the production yield to 73% in the presence of the additional base DBU (1,8-diazabicyclo[5.4.0]undec-7-ene), to 90% in the presence of trisodium phosphate (Na$_3$PO$_4$), and to 94% in the presence of sodium carbonate (Na$_2$CO$_3$) (Nos. 4 to 6). From the data, it was understood that the product could be obtained at excellent yield in the presence of carbonate bases and thus carbonate-based ammonia is one of the optimum ammonia sources.

The production yield was 77% after the reaction with ammonium formate (HCO2NH4) and peaked at 99% for ammonium carbonate [(NH$_4$)$_2$CO$_3$] (Nos. 7 and 8). That is, the highest yield was obtained with ammonium carbonate [(NH$_4$)$_2$CO$_3$].

The product was produced at yields of 83%, 27%, and 23% when the reaction was carried out in N,N-dimethylformamide (DMF), tetrahydrofuran (THF), and ethanol (EtOH), respectively (Nos. 9 to 11).

The reaction using toluene or dichloromethane (DCM) as a solvent did not afford the product (Nos. 12 and 13). Even when the amount of ammonium carbonate [$(NH_4)_2CO_3$] was reduced to 0.6 equivalents, the product could be obtained at a yield of 99% (No. 14). In this regard, the isolated yield was measured to be 92%.

Hence, the optimal conditions for synthesis of benzamide from N-phenyl-N-tosyl benzamide were identified as follows: 1.0 equivalent of N-phenyl-N-tosyl benzamide as a substrate; 0.6 equivalents of $(NH_4)_2CO_3$ as an ammonia source; DMSO as a solvent; 25° C. as reaction time; and 6 hours for reaction.

Figure 3:
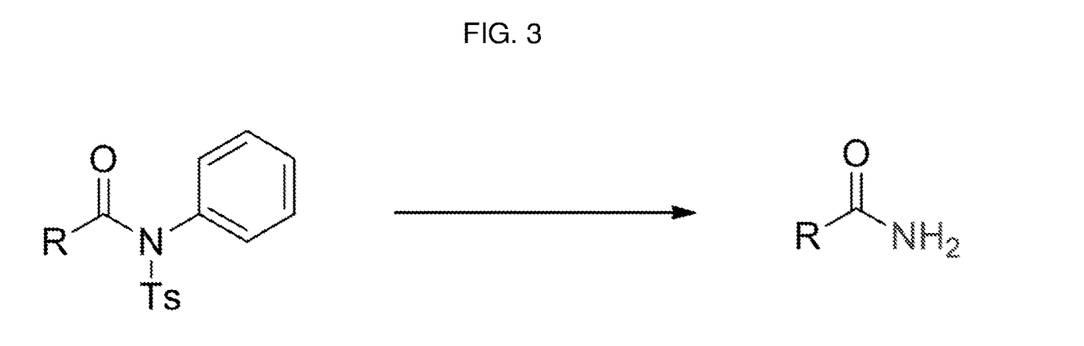
FIG. 3 is a reaction scheme of synthesizing a primary benzamide from substituted N-phenyl-N-tosyl benzamide according to an embodiment of the present disclosure.

Example 2. Synthesis of Primary Amide from Substituted N-Phenyl-N-Tosyl Benzamide Referring to the optimal conditions, the reaction was performed, as illustrated in the reaction scheme of FIG. 3, at a reaction temperature of 25 to 40° C. for 6 to 16 hours, using 1.0 mmol of substituted N-phenyl-N-tosyl benzamide as substrates, 0.6 mmol of ammonium carbonate [$(NH_4)_2CO_3$] as an ammonia source, and dimethyl sulfoxide (DMSO) as a solvent, to afford corresponding primary amides.

The yields of the products were measured by gas chromatography-mass spectrometry (GCMS) and are summarized as % in Table 2.

TABLE 2

| No. | Substrate | Yield (%) (25° C., 6 h) | Yield (%) (40° C., 16 h) | Yield (%) (40° C., 5 d) |
|---|---|---|---|---|
| 15 | 2-methyl-N-phenyl-N-tosylbenzamide | 4 | 51 | 83 |
| 16 | 3-methyl-N-phenyl-N-tosylbenzamide | 91 | — | — |
| 17 | 4-methyl-N-phenyl-N-tosylbenzamide | 97 | — | — |
| 18 | 4-(tert-butyl)-N-phenyl-N-tosylbenzamide | 97 | — | — |
| 19 | N-phenyl-N-tosyl-[1,1'-biphenyl]-4-carboxamide | 94 | — | — |
| 20 | N-phenyl-N-tosyl-1-naphthamide | 32 | 78 | — |
| 21 | N-phenyl-N-tosyl-2-naphthamide | 97 | — | — |
| 22 | 2-methoxy-N-phenyl-N-tosylbenzamide | 64 | 96 | — |
| 23 | 3-methoxy-N-phenyl-N-tosylbenzamide | 99 | — | — |
| 24 | 4-methoxy-N-phenyl-N-tosylbenzamide | 81 | — | — |
| 25 | 3,4-Dimethoxy-N-phenyl-N-tosylbenzamide | 97 | — | — |
| 26 | 3-(Dimethylamino)-N-phenyl-N-tosylbenzamide | 90 | — | — |
| 27 | 4-(Dimethylamino)-N-phenyl-N-tosylbenzamide | 38 | 79 | — |
| 28 | 2-Fluoro-N-phenyl-N-tosylbenzamide | 93 | — | — |
| 29 | 3-Fluoro-N-phenyl-N-tosylbenzamide | 94 | — | — |
| 30 | 4-Fluoro-N-phenyl-N-tosylbenzamide | 99 | — | — |
| 31 | 2-Chloro-N-phenyl-N-tosylbenzamide | 45 | 88 | — |
| 32 | Trichloro-N-phenyl-N-tosylbenzamide | 0 | 0 | 0 |
| 33 | 2-Bromo-N-phenyl-N-tosylbenzamide | 35 | 75 | 79 |
| 34 | 2-Iodo-N-phenyl-N-tosylbenzamide | 22 | 62 | 72 |
| 35 | 3-Iodo-N-phenyl-N-tosylbenzamide | 86 | — | — |
| 36 | 4-Iodo-N-phenyl-N-tosylbenzamide | 83 | — | — |
| 37 | 4-Cyano-N-phenyl-N-tosylbenzamide | 85 | — | — |
| 38 | 2-Nitro-N-phenyl-N-tosylbenzamide | 74 | — | — |
| 39 | 4-Nitro-N-phenyl-N-tosylbenzamide | 91 | — | — |
| 40 | Methyl 4-(phenyl(tosyl)carbamoyl)benzoate | 86 | — | — |
| 41 | 4-Acetyl-N-phenyl-N-tosylbenzamide | 82 | — | — |
| 42 | 4-Amino-N-phenyl-N-tosylbenzamide | trace | 55 | — |
| 43 | tert-butyl (4-(phenyl(tosyl)carbamoyl)phenyl)carbamate | 76 | — | — |
| 44 | 4-[Bis[(1,1-dimethylethoxy)carbonyl]amino]-N-phenyl-Ntosylbenzamide | 77 | — | — |
| 45 | tert-butyl (4-(phenyl(tosyl)carbamoyl)phenyl) carbonate | 44 | — | — |
| 46 | tert-butyl (4-(phenyl(tosyl)carbamoyl)phenyl) carbonate (deprotected) | 19 | — | — |
| 47 | 4-((tert-butyldimethylsilyl)oxy)-N-phenyl-N-tosylbenzamide | trace | 50 | — |
| 48 | 4-((tert-butyldimethylsilyl)oxy)-N-phenyl-N-tosylbenzamide (deprotected) | trace | 43 | — |
| 49 | 3-((tert-butyldimethylsilyl)oxy)-N-phenyl-N-tosylbenzamide | 44 | 51 | — |
| 50 | 3-((tert-butyldimethylsilyl)oxy)-N-phenyl-N-tosylbenzamide (deprotected) | 43 | 40 | — |
| 51 | N-phenyl-N-tosylfuran-3-carboxamide | 70 (100) | — | — |
| 52 | N-phenyl-N-tosylfuran-2-carboxamide | 73 (93) | — | — |
| 53 | N-phenyl-N-tosylpicolinamide | 77 (99) | — | — |
| 54 | N-phenyl-N-tosylisonicotinamide | 39 (99) | — | — |
| 55 | N-phenyl-N-tosylcinnamamide | 78 (80) | — | — |
| 56 | N,2-Diphenyl-N-tosylacetamide | 81 | — | — |
| 57 | 2-(Naphthalen-1-yl)-N-phenyl-N-tosylacetamide | 88 | — | — |
| 58 | N-phenyl-N-tosylpentanamide | 67 (70) | — | — |
| 59 | N-phenyl-N-tosylcyclohexanecarboxamide | 79 | — | — |
| 60 | N-phenyl-N-tosyladamantane-1-carboxamide | 15 | 83 | — |

As shown in Table 2, the product 2-methyl benzamide, represented by the following Chemical Formula 4, was produced at a yield of 4% when 2-methyl-N-phenyl-N-tosylbenzamide was reacted at 25° C. for 6 hours (No. 15). The production yield increased to 51% when the temperature condition was raised to 40° C. and to 83% when the reaction was conducted for 5 days.

[Chemical Formula 4]

Chromatography and 1H NMR measured as follows: Mp: 139-140° C.; 1H NMR (500 MHz, DMSO-d6) δ 7.69 (s, 1H), 7.38-7.27 (m, 3H), 7.24-7.17 (m, 2H), 2.36 (s, 3H); 13C NMR (126 MHz, DMSO-d6) δ 171.5, 137.5, 135.5, 130.9, 129.6, 127.4, 125.8, 20.0.

From 3-methyl-N-phenyl-N-tosylbenzamide, the product 3-methyl benzamide, represented by the following Chemical Formula 5, was obtained at a yield of 91% in the temperature condition of 25° C. (No. 16).

[Chemical Formula 5]

Chromatography and 1H NMR measured as follows: Mp: 90-91° C.; 1H NMR (500 MHz, DMSO-d6) δ 7.92 (s, 1H), 7.69 (s, 1H), 7.67-7.63 (m, 1H), 7.36-7.26 (m, 3H), 2.34 (s, 3H); 13C NMR (126 MHz, DMSO-d6) δ 168.4, 137.9, 134.7, 132.2, 128.52, 128.51, 125.0, 21.4.

From 4-methyl-N-phenyl-N-tosylbenzamide, the product 4-methyl benzamide, represented by the following Chemical Formula 6, was obtained at a yield of 97% in the temperature condition of 25° C. (No. 17).

[Chemical Formula 6]

Chromatography and 1H NMR measured as follows: Mp: 158-159° C.; 1H NMR (500 MHz, DMSO-d6) δ 7.89 (s, 1H), 7.77 (d, J=8.1 Hz, 2H), 7.27 (s, 1H), 7.24 (d, J=7.9 Hz, 2H), 2.33 (s, 3H); 13C NMR (126 MHz, DMSO-d6) δ 168.2, 141.5, 131.9, 129.2, 127.9, 21.4.

From 4-(tert-butyl)-N-phenyl-N-tosylbenzamide, the product 4-(tert-butyl)benzamide, represented by the following Chemical Formula 7, was obtained at a yield of 97% in the temperature condition of 25° C. (No. 18).

[Chemical Formula 7]

Chromatography and 1H NMR measured as follows: Mp: 164-165° C.; 1H NMR (500 MHz, DMSO-d6) δ 7.90 (s, 1H), 7.80 (d, J=8.6 Hz, 2H), 7.44 (d, J=8.6 Hz, 2H), 7.28 (s, 1H), 1.28 (s, 9H); 13C NMR (126 MHz, DMSO-d6) δ 168.3, 154.4, 132.0, 127.8, 125.4, 35.0, 31.4.

From N-phenyl-N-tosyl-[1,1-biphenyl]-4-carboxamide, the product 1,1-biphenyl]-4-carboxamide, represented by the following Chemical Formula 8, was obtained at a yield of 94% in the temperature condition of 25° C. (No. 19).

[Chemical Formula 8]

Chromatography and 1H NMR measured as follows: Mp: 219-220° C.; 1H NMR (500 MHz, DMSO-d6) δ 8.05 (s, 1H), 7.98 (d, J=8.4 Hz, 2H), 7.75 (d, J=8.4 Hz, 2H), 7.72 (d, J=7.2 Hz, 2H), 7.51-7.45 (m, 2H), 7.42 (s, 1H), 7.39 (t, J=7.4 Hz, 1H); 13C NMR (126 MHz, DMSO-d6) δ 168.0, 143.21, 139.7, 133.5, 129.5, 128.6, 128.5, 127.3, 126.9.

From N-phenyl-N-tosyl-1-naphthamide, the product 1-naphthamide, represented by the following Chemical Formula 9, was obtained at a yield of 78% in the temperature condition of 25° C. (No. 20).

[Chemical Formula 9]

Chromatography and 1H NMR measured as follows: Mp: 199-200° C.; 1H NMR (500 MHz, DMSO-d6) δ 8.33 (d, J=7.5 Hz, 1H), 8.08-7.94 (m, 3H), 7.69-7.50 (m, 5H); 13C NMR (126 MHz, DMSO-d6) δ 171.0, 135.1, 133.6, 130.21, 130.17, 128.6, 127.0, 126.6, 126.0, 125.6, 125.4.

From N-phenyl-N-tosyl-2-naphthamide, the product 2-naphthamide, represented by the following Chemical Formula 10, was obtained at a yield of 97% in the temperature condition of 25° C. (No. 21).

[Chemical Formula 10]

Chromatography and 1H NMR measured as follows: Mp: 192-193° C.; 1H NMR (500 MHz, DMSO-d6) δ 8.50 (s, 1H), 8.15 (s, 1H), 8.04-7.92 (m, 4H), 7.63-7.54 (m, 2H), 7.49 (s, 1H); 13C NMR (126 MHz, DMSO-d6) δ 168.4, 134.6, 132.6, 132.1, 129.31, 128.27, 128.2, 128.04, 128.01, 127.1, 124.9.

From 2-methoxy-N-phenyl-N-tosylbenzamide, the product 2-methoxybenzamide, represented by the following Chemical Formula 11, was obtained at a yield of 64% in the temperature condition of 25° C. (No. 22). The production yield was measured to be 96% in the temperature condition of 40° C.

[Chemical Formula 11]

Chromatography and 1H NMR measured as follows: Mp: 120-121° C.; 1H NMR (500 MHz, DMSO-d6) δ 7.80 (dd, J=7.7, 1.8 Hz, 1H), 7.63 (s, 1H), 7.52 (s, 1H), 7.48-7.43 (m, 1H), 7.12 (d, J=8.0 Hz, 1H), 7.04-6.99 (m, J=7.6, 0.9 Hz, 1H), 3.88 (s, 3H); 13C NMR (126 MHz, DMSO-d6) δ 166.7, 157.7, 132.9, 131.2, 123.1, 120.8, 112.4, 56.2.

From 3-methoxy-N-phenyl-N-tosylbenzamide, the product 3-methoxybenzamide, represented by the following Chemical Formula 12, was obtained at a yield of 99% in the temperature condition of 25° C. (No. 23).

[Chemical Formula 12]

Chromatography and 1H NMR measured as follows: Mp: 122-123° C.; 1H NMR (500 MHz, DMSO-d6) δ 7.97 (s, 1H), 7.49-7.29 (m, 4H), 7.11-7.03 (m, 1H), 3.78 (s, 3H); 13C NMR (126 MHz, DMSO-d6) δ 168.1, 159.6, 136.2, 129.8, 120.1, 117.5, 113.1, 55.7.

From 4-methoxy-N-phenyl-N-tosylbenzamide, the product 4-methoxybenzamide, represented by the following Chemical Formula 13, was obtained at a yield of 81% in the temperature condition of 25° C. (No. 24).

[Chemical Formula 13]

Chromatography and 1H NMR measured as follows: Mp: 163-164° C.; 1H NMR (500 MHz, DMSO-d6) δ 7.84 (d, J=8.9 Hz, 3H), 7.18 (s, 1H), 6.97 (d, J=8.9 Hz, 2H), 3.79 (s, 3H); 13C NMR (126 MHz, DMSO-d6) δ 167.8, 162.0, 129.8, 126.9, 113.8, 55.8.

From 3,4-dimethoxy-N-phenyl-N-tosylbenzamide, the product 3,4-dimethoxybenzamide, represented by the following Chemical Formula 14, was obtained at a yield of 97% in the temperature condition of 25° C. (No. 25).

[Chemical Formula 14]

Chromatography and 1H NMR measured as follows: Mp: 163-164° C.; 1H NMR (500 MHz, DMSO-d6) δ 7.87 (s, 1H), 7.50 (dd, J=8.3, 2.0 Hz, 1H), 7.46 (d, J=2.0 Hz, 1H), 7.21 (s, 1H), 6.99 (d, J=8.4 Hz, 1H), 3.79 (s, 3H), 3.78 (s, 3H); 13C NMR (126 MHz, DMSO-d6) δ 167.9, 151.7, 148.6, 127.0, 121.2, 111.3, 111.2, 55.99, 55.93.

From 3-(dimethylamino)-N-phenyl-N-tosylbenzamide the product 3-methoxybenzamide, represented by the following Chemical Formula 15, was obtained at a yield of 90% in the temperature condition of 25° C. (No. 26).

[Chemical Formula 15]

Chromatography and 1H NMR measured as follows: Mp: 150-151° C.; 1H NMR (500 MHz, DMSO-d6) δ 7.89 (s, 1H), 7.27 (s, 1H), 7.25-7.14 (m, 3H), 6.85 (dd, J=8.1, 2.4 Hz, 1H), 2.93 (s, 6H); 13C NMR (126 MHz, DMSO-d6) δ 169.0, 150.7, 135.4, 129.1, 115.6, 115.4, 111.7, 40.6.

From 4-(dimethylamino)-N-phenyl-N-tosylbenzamide, the product 4-(dimethylamino)benzamide, represented by the following Chemical Formula 16, was obtained at a yield of 38% in the temperature condition of 25° C. (No. 27).

[Chemical Formula 16]

Chromatography and 1H NMR measured as follows: Mp: 207-208° C.; 1H NMR (500 MHz, DMSO-d6) δ 7.73 (d, J=8.9 Hz, 2H), 7.63 (s, 1H), 6.93 (s, 1H), 6.67 (d, J=9.0 Hz, 2H), 2.94 (s, 6H); 13C NMR (126 MHz, DMSO-d6) δ 168.4, 152.5, 129.4, 121.4, 111.1, 40.2.

From 2-fluoro-N-phenyl-N-tosylbenzamide, the product 2-fluorobenzamide, represented by the following Chemical Formula 17, was obtained at a yield of 93% in the temperature condition of 25° C. (No. 28).

[Chemical Formula 17]

Chromatography and 1H NMR measured as follows: Mp: 113-114° C.; 1H NMR (500 MHz, DMSO-d6) δ 7.78-7.57 (m, 3H), 7.54-7.48 (m, 1H), 7.30-7.21 (m, 2H); 13C NMR (126 MHz, DMSO-d6) δ 165.7, 159.7 (d, J=249.5 Hz), 132.9 (d, J=8.5 Hz), 130.7 (d, J=3.0 Hz), 124.8 (d, J=3.4 Hz), 124.3 (d, J=14.3 Hz), 116.5 (d, J=22.7 Hz).

From 3-fluoro-N-phenyl-N-tosylbenzamide, the product 3-fluorobenzamide, represented by the following Chemical Formula 18, was obtained at a yield of 94% in the temperature condition of 25° C. (No. 29).

[Chemical Formula 18]

Chromatography and 1H NMR measured as follows: Mp: 127-129° C.; 1H NMR (500 MHz, DMSO-d6) δ 8.08 (s, 1H), 7.74 (d, J=7.8 Hz, 1H), 7.70-7.64 (m, 1H), 7.54 (s, 1H), 7.54-7.48 (m, 1H), 7.42-7.34 (m, 1H); 13C NMR (126 MHz, DMSO-d6) δ 166.9 (d, J=2.4 Hz), 162.4 (d, J=244.4 Hz), 137.2 (d, J=6.6 Hz), 130.8 (d, J=8.0 Hz), 124.0 (d, J=2.8 Hz), 118.5 (d, J=21.4 Hz), 114.6 (d, J=22.7 Hz).

From 4-fluoro-N-phenyl-N-tosylbenzamide, the product 4-fluorobenzamide, represented by the following Chemical Formula 19, was obtained at a yield of 99% in the temperature condition of 25° C. (No. 30).

[Chemical Formula 19]

Chromatography and 1H NMR measured as follows: Mp: 139-140° C.; 1H NMR (500 MHz, DMSO-d6) δ 8.00 (s, 1H), 7.94 (dd, J=8.8, 5.6 Hz, 2H), 7.40 (s, 1H), 7.31-7.23 (m, 2H); 13C NMR (126 MHz, DMSO-d6) δ 167.2, 164.4 (d, J=248.2 Hz), 131.2 (d, J=2.8 Hz), 130.5 (d, J=9.0 Hz), 115.5 (d, J=22.7 Hz).

From 2-chloro-N-phenyl-N-tosylbenzamide, the product 2-chlorobenzamide, represented by the following Chemical Formula 20, was obtained at a yield of 45% in the temperature condition of 25° C. (No. 31). The production yield was measured to be 88% in the temperature condition of 40° C.

[Chemical Formula 20]

Chromatography and 1H NMR measured as follows: Mp: 138-139° C.; 1H NMR (500 MHz, DMSO-d6) δ 7.87 (s, 1H), 7.58 (s, 1H), 7.49-7.45 (m, 1H), 7.45-7.39 (m, 2H), 7.39-7.34 (m, 1H); 13C NMR (126 MHz, DMSO-d6) δ 168.6, 137.6, 131.0, 130.06, 130.04, 129.1, 127.5.

From trichloro-N-phenyl-N-tosylbenzamide, the product trichlorobenzamide, represented by the following Chemical Formula 21, was obtained at a yield of 0% in the temperature condition of 25° C. (No. 32). The product was not obtained even when the reaction was conducted for 5 days in the temperature condition of 40° C.

[Chemical Formula 21]

From 2-bromo-N-phenyl-N-tosylbenzamide, the product 2-bromobenzamide, represented by the following Chemical Formula 22, was obtained at a yield of 35% in the temperature condition of 25° C. (No. 33). The production yield increased to 75% in the temperature condition of 40° C. and further to 79% when the reaction was carried out for 5 days.

[Chemical Formula 22]

Chromatography and 1H NMR measured as follows: Mp: 157-158° C.; 1H NMR (500 MHz, DMSO-d6) δ 7.87 (s, 1H), 7.64 (d, J=7.6 Hz, 1H), 7.57 (s, 1H), 7.45-7.39 (m, 2H), 7.37-7.31 (m, 1H); 13C NMR (126 MHz, DMSO-d6) δ 169.5, 139.8, 133.1, 131.1, 129.0, 127.9, 119.0.

From 2-iodo-N-phenyl-N-tosylbenzamide, the product 2-iodobenzamide, represented by the following Chemical Formula 23, was obtained at a yield of 22% in the temperature condition of 25° C. (No. 34). The production yield increased to 62% in the temperature condition of 40° C. and further to 72% when the reaction was carried out for 5 days.

[Chemical Formula 23]

Chromatography and 1H NMR measured as follows: Mp: 178-180° C.; 1H NMR (500 MHz, DMSO-d6) δ 7.86 (d, J=7.9 Hz, 1H), 7.81 (s, 1H), 7.51 (s, 1H), 7.44-7.39 (m, 1H), 7.36-7.30 (m, 1H), 7.17-7.11 (m, 1H); 13C NMR (126 MHz, DMSO-d6) δ 171.1, 143.6, 139.6, 131.0, 128.4, 128.2, 93.6.

From 3-iodo-N-phenyl-N-tosylbenzamide, the product 3-iodobenzamide, represented by the following Chemical Formula 24, was obtained at a yield of 86% in the temperature condition of 25° C. (No. 35).

[Chemical Formula 24]

Chromatography and 1H NMR measured as follows: Mp: 186-187° C.; 1H NMR (500 MHz, DMSO-d6) δ 8.24-8.18 (m, 1H), 8.06 (s, 1H), 7.90-7.84 (m, 2H), 7.48 (s, 1H), 7.29-7.23 (m, 1H); 13C NMR (126 MHz, DMSO-d6) δ 166.8, 140.2, 136.7, 136.4, 130.9, 127.3, 95.1.

From 4-iodo-N-phenyl-N-tosylbenzamide, the product 4-iodobenzamide, represented by the following Chemical Formula 25, was obtained at a yield of 83% in the temperature condition of 25° C. (No. 36).

[Chemical Formula 25]

Chromatography and 1H NMR measured as follows: Mp: 217-218° C.; 1H NMR (500 MHz, DMSO-d6) δ 8.02 (s, 1H), 7.83 (d, J=8.5 Hz, 2H), 7.64 (d, J=8.5 Hz, 2H), 7.44 (s, 1H); 13C NMR (126 MHz, DMSO-d6) δ 167.6, 137.6, 134.2, 129.9, 99.4.

As is understood from the data for Nos. 28 to 36, benzamides having halide substituents at the ortho-position thereof were converted into the products at low yield in the temperature condition of 25° C. due to the steric hinderance of the substituents, but the production yields increased in the temperature condition of 40° C.

From 4-cyano-N-phenyl-N-tosylbenzamide, the product 4-cyanobenzamide, represented by the following Chemical Formula 26, was obtained at a yield of 85% in the temperature condition of 25° C. (No. 37).

[Chemical Formula 26]

Chromatography and 1H NMR measured as follows: Mp: 226-227° C.; 1H NMR (500 MHz, DMSO-d6) δ 8.21 (s, 1H), 8.01 (d, J=8.3 Hz, 2H), 7.94 (d, J=8.3 Hz, 2H), 7.67 (s, 1H); 13C NMR (126 MHz, DMSO-d6) δ 166.9, 138.7, 132.8, 128.7, 118.8, 114.1.

From 2-nitro-N-phenyl-N-tosylbenzamide, the product 2-nitrobenzamide, represented by the following Chemical Formula 27, was obtained at a yield of 74% in the temperature condition of 25° C. (No. 38).

[Chemical Formula 27]

Chromatography and 1H NMR measured as follows: Mp: 176-177° C.; 1H NMR (500 MHz, DMSO-d6) δ 8.14 (s, 1H), 7.99 (dd, J=8.1, 0.9 Hz, 1H), 7.80-7.73 (m, 1H), 7.72-7.59 (m, 3H); 13C NMR (126 MHz, DMSO-d6) δ 167.6, 147.7, 133.8, 133.0, 131.1, 129.3, 124.4.

From 4-nitro-N-phenyl-N-tosylbenzamide, the product 4-nitrobenzamide, represented by the following Chemical Formula 28, was obtained at a yield of 91% in the temperature condition of 25° C. (No. 39).

[Chemical Formula 28]

Chromatography and 1H NMR measured as follows: Mp: 199-200° C.; 1H NMR (500 MHz, DMSO-d6) δ 8.36-8.21 (m, 3H), 8.09 (d, J=8.9 Hz, 2H), 7.72 (s, 1H); 13C NMR (126 MHz, DMSO-d6) δ 166.6, 149.5, 140.4, 129.4, 123.9.

From methyl 4-(phenyl(tosyl)carbamoyl)benzoate, the product methyl 4-carbamoylbenzoate, represented by the following Chemical Formula 29, was obtained at a yield of 86% in the temperature condition of 25° C. (No. 40).

[Chemical Formula 29]

Chromatography and 1H NMR measured as follows: Mp: 202-203° C.; 1H NMR (500 MHz, DMSO-d6) δ 8.11 (s, 1H), 7.97 (AB q, J=8.3 Hz, 4H), 7.54 (s, 1H), 3.83 (s, 3H); 13C NMR (126 MHz, DMSO-d6) δ 167.5, 166.1, 138.8, 132.2, 129.5, 128.2, 52.8.

From 4-acetyl-N-phenyl-N-tosylbenzamide, the product 4-acetylbenzamide, represented by the following Chemical Formula 30, was obtained at a yield of 82% in the temperature condition of 25° C. (No. 41).

[Chemical Formula 30]

Chromatography and 1H NMR measured as follows: Mp: 190-192° C.; 1H NMR (500 MHz, DMSO-d6) δ 8.14 (s, 1H), 7.99 (AB q, J=8.4 Hz, 4H), 7.57 (s, 1H), 2.60 (s, 3H); 13C NMR (126 MHz, DMSO-d6) δ 198.2, 167.5, 139.1, 138.5, 128.5, 128.2, 27.4.

From 4-amino-N-phenyl-N-tosylbenzamide, the product 4-aminobenzamide, represented by the following Chemical Formula 31, was obtained at a yield of 55% in the temperature condition of 25° C. (No. 42).

[Chemical Formula 31]

Chromatography and 1H NMR measured as follows: Mp: 181-182° C.; 1H NMR (500 MHz, DMSOd6) δ 7.55 (d, J=8.5 Hz, 2H), 7.47 (s, 1H), 6.80 (s, 1H), 6.49 (d, J=8.5 Hz, 2H), 5.56 (s, 2H); 13C NMR (126 MHz, DMSO-d6) δ 168.4, 152.1, 129.5, 121.4, 112.9.

From tert-butyl (4-(phenyl(tosyl)carbamoyl)phenyl)carbamate, the product tert-butyl (4-carbamoylphenyl)carbamate, represented by the following Chemical Formula 32, was obtained at a yield of 76% in the temperature condition of 25° C. (No. 43).

[Chemical Formula 32]

Chromatography and 1H NMR measured as follows: Mp: 225-226° C.; 1H NMR (500 MHz, DMSO-d6) δ 9.60 (s, 1H), 7.81 (s, 1H), 7.77 (d, J=8.5 Hz, 2H), 7.49 (d, J=8.5 Hz, 2H), 7.19 (s, 1H), 1.46 (s, 9H); 13C NMR (126 MHz, DMSO-d6) δ 167.9, 153.0, 142.7, 128.8, 128.0, 117.4, 79.9, 28.5; HRMS (ESI-TOF) m/z: [M+Na]+ Calcd for C12H16N2O3Na 259.1059; Found 259.1060.

From 4-[bis[(1,1-dimethylethoxy)carbonyl]amino]-N-phenyl-N-tosylbenzamide, the product 4-[bis[(1,1-dimethylethoxy)carbonyl]amino] benzamide, represented by the following Chemical Formula 33, was obtained at a yield of 77% in the temperature condition of 25° C. (No. 44).

[Chemical Formula 33]

Chromatography and 1H NMR measured as follows: Mp: 175-176° C.; 1H NMR (500 MHz, DMSO-d6) δ 8.02 (s, 1H), 7.87 (d, J=8.4 Hz, 2H), 7.43 (s, 1H), 7.26 (d, J=8.4 Hz, 2H), 1.38 (s, 18H); 13C NMR (126 MHz, DMSO-d6) δ 167.2, 151.1, 141.5, 133.0, 128.0, 127.4, 82.5, 27.5; HRMS (ESI-TOF) m/z: [M+Na]+ Calcd for C17H24N2O5Na 359.1583; Found 359.1582.

From tert-butyl (4-(phenyl(tosyl)carbamoyl)phenyl)carbonate, the product tert-butyl (4-carbamoylphenyl) carbonate, represented by the following Chemical Formula 34, was obtained at a yield of 44% in the temperature condition of 25° C. (No. 45).

[Chemical Formula 34]

Chromatography and 1H NMR measured as follows: Mp: 146-147° C.; 1H NMR (500 MHz, DMSO-d6) δ 8.01 (s, 1H), 7.92 (d, J=8.5 Hz, 2H), 7.42 (s, 1H), 7.27 (d, J=8.5 Hz, 2H), 1.49 (s, 9H); 13C NMR (126 MHz, DMSO-d6) δ 167.0, 152.7, 150.9, 131.9, 129.0, 121.2, 83.6, 27.2.

From tert-butyl (4-(phenyl(tosyl)carbamoyl)phenyl)carbonate, the product 4-hydroxybenzamide, represented by the following Chemical Formula 35, was obtained at a yield of 19% in the temperature condition of 25° C. (No. 46).

[Chemical Formula 35]

Chromatography and 1H NMR measured as follows: Mp: 141-142° C.; 1H NMR (500 MHz, DMSO-d6) δ 9.89 (s, 1H), 7.73-7.63 (m, 3H), 7.03 (s, 1H), 6.74 (d, J=8.5 Hz, 2H); 13C NMR (126 MHz, DMSO-d6) δ 168.0, 160.5, 129.9, 125.4, 115.1.

It was observed that a product like deprotected 4-hydroxybenzamide was obtained at low yield from a deprotected starting material such as deprotected tert-butyl (4-carbamoylphenyl) carbonate.

From 4-((tert-butyldimethylsilyl)oxy)-N-phenyl-N-tosylbenzamide, the product 4-((tertbutyldimethylsilyl)oxy)benzamide, represented by the following Chemical Formula 36, was obtained at a yield of 50% in the temperature condition of 25° C. (No. 47).

Chromatography and 1H NMR measured as follows: Mp: 135-136° C.; 1H NMR (500 MHz, DMSO-d6) δ 7.79 (s, 1H), 7.77 (d, J=8.6 Hz, 2H), 7.16 (s, 1H), 6.85 (d, J=8.6 Hz, 2H), 0.92 (s, 9H), 0.17 (s, 6H); 13C NMR (126 MHz, DMSO-d6) δ 167.8, 158.2, 129.8, 127.9, 119.8, 25.9, 18.4, −4.1.

From 4-((tert-butyldimethylsilyl)oxy)-N-phenyl-N-tosylbenzamide, the product 4-hydroxybenzamide, represented by the following Chemical Formula 37, was obtained at a yield of 43% in the temperature condition of 25° C. (No. 48).

Chromatography and 1H NMR measured as follows: Mp: 141-142° C.; 1H NMR (500 MHz, DMSO-d6) δ 9.89 (s, 1H), 7.73-7.63 (m, 3H), 7.03 (s, 1H), 6.74 (d, J=8.5 Hz, 2H); 13C NMR (126 MHz, DMSO-d6) δ 168.0, 160.5, 129.9, 125.4, 115.1.

It was observed that a product like deprotected 4-hydroxybenzamide was obtained at low yield from a deprotected starting material such as deprotected 4-tert-(butyldimethylsilyloxy)benzamide.

From 3-methoxy-N-phenyl-N-tosylbenzamide, the product 3-((tert-butyldimethylsilyl)oxy)-N-phenyl-N-tosylbenzamide, represented by the following Chemical Formula 38, was obtained at a yield of 44% in the temperature condition of 25° C. (No. 49). The production yield increased to 51% in the temperature condition of 40° C.

Chromatography and 1H NMR measured as follows: Mp: 142-143° C.; 1H NMR (500 MHz, DMSO-d6) δ 7.92 (s, 1H), 7.45 (d, J=7.7 Hz, 1H), 7.35-7.24 (m, 3H), 6.95 (dd, J=8.0, 1.5 Hz, 1H), 0.92 (s, 9H), 0.16 (s, 6H); 13C NMR (126 MHz, DMSO-d6) δ 167.9, 155.4, 136.3, 129.8, 123.1, 121.0, 119.4, 26.0, 18.4, −4.1; HRMS (ESI-TOF) m/z: [M+Na]+ Calcd for C13H21 NO2SiNa 274.1239; Found 274.1239.

From 3-((tert-butyldimethylsilyl)oxy)-N-phenyl-N-tosylbenzamide, the product 3-hydroxybenzamide, represented by the following Chemical Formula 39, was obtained at a yield of 43% in the temperature condition of 25° C. (No. 50).

The production yield was decreased when the reaction was carried out for 16 hours in the temperature condition of 40° C.

Chromatography and 1H NMR measured as follows: Mp: 167-168° C.; 1H NMR (500 MHz, DMSO-d6) δ 9.55 (s, 1H), 7.81 (s, 1H), 7.31-7.09 (m, 4H), 6.85 (d, J=7.2 Hz, 1H); 13C NMR (126 MHz, DMSO-d6) δ 168.4, 157.6, 136.2, 129.6, 118.5, 118.4, 114.9.

From N-phenyl-N-tosylfuran-3-carboxamide, the product furan-3-carboxamide, represented by the following Chemical Formula 40, was obtained at a yield of 70% in the temperature condition of 25° C. (No. 51). The production yield was observed to be 100% as measured by 1H NMR spectroscopy in the presence of an internal standard.

Chromatography and 1H NMR measured as follows: Mp: 173-174° C.; 1H NMR (500 MHz, DMSO-d6) δ 8.15 (dd, J=1.5, 0.8 Hz, 1H), 7.71-7.68 (m, 1H), 7.64 (s, 1H), 7.19 (s, 1H), 6.80 (dd, J=1.8, 0.8 Hz, 1H); 13C NMR (126 MHz, DMSO-d6) δ 163.8, 145.8, 144.4, 123.3, 109.7.

From N-phenyl-N-tosylfuran-2-carboxamide, the product furan-2-carboxamide, represented by the following Chemical Formula 41, was obtained at a yield of 73% in the temperature condition of 25° C. (No. 52). The production yield was observed to be 93% as measured by 1H NMR spectroscopy in the presence of an internal standard.

Chromatography and 1H NMR measured as follows: Mp: 141-142° C.; 1H NMR (500 MHz, DMSO-d6) δ 7.80 (dd, J=1.6, 0.7 Hz, 1H), 7.75 (s, 1H), 7.36 (s, 1H), 7.08 (dd, J=3.4, 0.7 Hz, 1H), 6.59 (dd, J=3.4, 1.7 Hz, 1H); 13C NMR (126 MHz, DMSO-d6) δ 159.8, 148.5, 145.4, 114.0, 112.2.

From N-phenyl-N-tosylpicolinamide, the product picolinamid, represented by the following Chemical Formula 42, was obtained at a yield of 77% in the temperature condition of 25° C. (No. 53). The production yield was observed to be 99% as measured by 1H NMR spectroscopy in the presence of an internal standard.

[Chemical Formula 42]

Chromatography and 1H NMR measured as follows: Mp: 106-107° C.; 1H NMR (500 MHz, DMSO-d6) δ 8.62 (d, J=4.7 Hz, 1H), 8.12 (s, 1H), 8.03 (d, J=7.8 Hz, 1H), 8.00-7.94 (m, 1H), 7.65 (s, 1H), 7.60-7.55 (m, 1H); 13C NMR (126 MHz, DMSO-d6) δ 166.5, 150.7, 148.9, 138.1, 126.9, 122.3.

From N-phenyl-N-tosylisonicotinamide, the product isonicotinamide, represented by the following Chemical Formula 43, was obtained at a yield of 39% in the temperature condition of 25° C. (No. 54). The production yield was observed to be 99% as measured by 1H NMR spectroscopy in the presence of an internal standard.

[Chemical Formula 43]

Chromatography and 1H NMR measured as follows: Mp: 156-157° C.; 1H NMR (500 MHz, DMSO-d6) δ 8.71 (d, J=5.9 Hz, 2H), 8.23 (s, 1H), 7.76 (d, J=5.9 Hz, 2H), 7.72 (s, 1H); 13C NMR (126 MHz, DMSO-d6) δ 166.7, 150.7, S15 141.7, 121.8.

The heterogenous aromatic compounds such as furan carboxamide, picolinamide, and isonicotinamide were observed to be produced at a yield of 93 to 99% as measured by 1H NMR spectroscopy in the presence of an internal standard, but their isolated yields were measured to be as low as 70%, 73%, and 77%, respectively, because they were highly soluble to water.

From N-phenyl-N-tosylcinnamamide, the product cinnamamide, represented by the following Chemical Formula 44, was obtained at a yield of 78% in the temperature condition of 25° C. (No. 55). The production yield was observed to be 80% as measured by 1H NMR spectroscopy in the presence of an internal standard.

[Chemical Formula 44]

Chromatography and 1H NMR measured as follows: Mp: 148-149° C.; 1H NMR (500 MHz, DMSO-d6) δ 7.63-7.49 (m, 3H), 7.45-7.33 (m, 4H), 7.12 (s, 1H), 6.61 (d, J=15.9 Hz, 1H); 13C NMR (126 MHz, DMSO-d6) δ 167.1, 139.6, 135.3, 129.9, 129.4, 128.0, 122.8.

From N,2-diphenyl-N-tosylacetamide, the product 2-phenylacetamide, represented by the following Chemical Formula 56, was obtained at a yield of 81% in the temperature condition of 25° C. (No. 56).

[Chemical Formula 45]

Chromatography and 1H NMR measured as follows: Mp: 158-159° C.; 1H NMR (500 MHz, DMSO-d6) δ 7.46 (s, 1H), 7.32-7.23 (m, 4H), 7.23-7.18 (m, 1H), 6.88 (s, 1H), 3.36 (s, 2H); 13C NMR (126 MHz, DMSO-d6) δ 172.7, 136.9, 129.5, 128.6, 126.7, 42.7.

From 2-(naphthalen-1-yl)-N-phenyl-N-tosylacetamide, the product 2-(naphthalen-1-yl)acetamide, represented by the following Chemical Formula 46, was obtained at a yield of 88% in the temperature condition of 25° C. (No. 57).

[Chemical Formula 46]

Chromatography and 1H NMR measured as follows: Mp: 181-182° C.; 1H NMR (500 MHz, DMSO-d6) δ 8.09 (d, J=8.1 Hz, 1H), 7.92 (d, J=7.6 Hz, 1H), 7.81 (d, J=7.6 Hz, 1H), 7.63-7.48 (m, 3H), 7.48-7.40 (m, 2H), 7.01 (s, 1H), 3.88 (s, 2H); 13C NMR (126 MHz, DMSO-d6) δ 172.6, 133.8, 133.4, 132.5, 128.8, 128.3, 127.4, 126.4, 126.1, 126.0, 124.8, 40.2.

Cinnamamide, phenyl acetamide, and naphthyl acetamide were all obtained at good yield.

From N-phenyl-N-tosylpentanamide, the product pentanamide, represented by the following Chemical Formula 47, was obtained at a yield of 67% in the temperature condition of 25° C. (No. 58). The production yield was observed to be 70% as measured by 1H NMR spectroscopy in the presence of an internal standard.

[Chemical Formula 47]

Chromatography and 1H NMR measured as follows: Mp: 107-108° C.; 1H NMR (500 MHz, DMSO-d6) δ 7.21 (s, 1H), 6.67 (s, 1H), 2.02 (t, J=7.5 Hz, 2H), 1.49-1.40 (m, 2H), 1.29-1.21 (m, 2H), 0.85 (t, J=7.4 Hz, 3H); 13C NMR (126 MHz, DMSO-d6) δ 174.7, 35.3, 27.7, 22.3, 14.2.

From N-phenyl-N-tosylcyclohexanecarboxamide, the product represented by the following Chemical Formula 48 was obtained at a yield of 79% in the temperature condition of 25° C. (No. 59).

[Chemical Formula 48]

Chromatography and 1H NMR measured as follows: Mp: 182-183° C.; 1H NMR (500 MHz, DMSO-d6) δ 7.13 (s, 1H), 6.62 (s, 1H), 2.11-1.96 (m, 1H), 1.78-1.49 (m, 5H), 1.34-1.05 (m, 5H); 13C NMR (126 MHz, DMSO-d6) δ 177.8, 44.1, 29.6, 26.0, 25.8.

From N-phenyl-N-tosyladamantane-1-carboxamide, the product adamantane-1-carboxamide, represented by the following Chemical Formula 49, was obtained at a yield of 15% in the temperature condition of 25° C. (No. 60). The production yield increased to 83% when the reaction was carried out for 16 hours in the temperature condition of 40° C.

[Chemical Formula 49]

Chromatography and 1H NMR measured as follows: Mp: 187-188° C.; 1H NMR (500 MHz, DMSO-d6) δ 6.92 (s, 1H), 6.66 (s, 1H), 1.93 (br s, 3H), 1.78-1.57 (m, 12H); 13C NMR (126 MHz, DMSO-d6) δ 179.7, 40.1, 39.2, 36.6, 28.1.

Primary, secondary, and tertiary alkyl carboxamides exhibited good yields while N-phenyl-N-tosyladamantane-1-carboxamide allowed for a good yield only after the reaction for hours in the temperature condition of 40° C.

Figure 4:
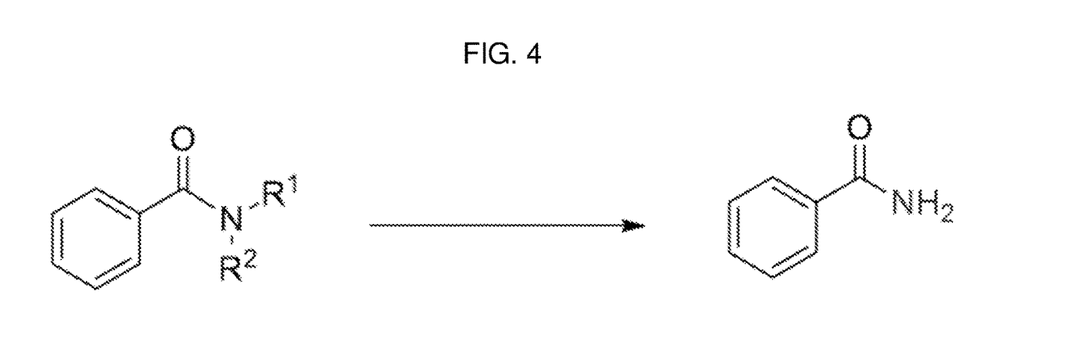
FIG. 4 is a reaction scheme of synthesizing a primary benzamide from N-tosyl benzamide having various substituents on the nitrogen atom thereof according to an embodiment of the present disclosure.

Example 3. Synthesis of Primary Amide from Benzamide Having Various Substituents on Nitrogen Atom Thereof Referring to the optimal conditions, the reaction was performed, as illustrated in the reaction scheme of FIG. 4, at a reaction temperature of 25 to 40° C. for 6 to 16 hours, using 1.0 mmol of each of benzamides having various substituents on the nitrogen atom thereof as substrates, 0.6 mmol of ammonium carbonate [$(NH_4)_2CO_3$] as an ammonia source, and dimethyl sulfoxide (DMSO) as a solvent, to afford the benzamide represented by Chemical Formula 3, which is a primary amide.

The yields of the products were measured by gas chromatography-mass spectrometry (GCMS) and are summarized as % in Table 3.

TABLE 3

| No. | Substrate | Yield (%) (25° C., 6 h) | Yield (%) (40° C., 16 h) |
|---|---|---|---|
| 61 | N-4-methoxphenyl N-tosyl benzamide | 65 | — |
| 62 | N-4-fluorophenyl N-tosyl benzamide | 92 | — |
| 63 | N-benzyl N-tosyl benzamide | 62 | — |
| 64 | N-methyl N-tosyl benzamide | 76 | — |
| 65 | N-Trifluoromethansulfonyl N-phenyl benzamide | 93 | — |
| 66 | N-mesityl N-phenyl benzamide | 90 | — |
| 67 | N-Boc protected N-phenyl benzamide | 11 | — |
| 68 | N-benzoyl saccharin N-phenyl benzamide | 69 | — |
| 69 | N-benzoyl succinimide N-phenyl benzamide | 89 | — |
| 70 | N-benzoyl glutarimide N-phenyl benzamide | 57 | — |
| 71 | N-methyl-N-phenyl benzamide | 0 | 0 |
| 72 | N,N-diphenyl benzamides | 0 | 0 |

As shown in Table 3, the primary benzamide represented by Chemical Formula 3 was produced at a yield of 65% in the temperature condition of 25° C. from N-4-methoxyphenyl N-tosylbenzamide, represented by Chemical formula 50 (No. 61).

[Chemical Formula 50]

The primary benzamide represented by Chemical Formula 3 was produced at a yield of 92% in the temperature condition of 25° C. from N-4-fluorophenyl N-tosyl benzamide, represented by Chemical formula 51 (No. 62).

[Chemical Formula 51]

The primary benzamide represented by Chemical Formula 3 was produced at a yield of 62% in the temperature condition of 25° C. from N-benzyl N-tosyl benzamide, represented by Chemical formula 52 (No. 63).

[Chemical Formula 52]

The primary benzamide represented by Chemical Formula 3 was produced at a yield of 76% in the temperature condition of 25° C. from N-methyl N-tosyl benzamide, represented by Chemical formula 53 (No. 64).

[Chemical Formula 53]

The primary benzamide represented by Chemical Formula 3 was produced at a yield of 93% in the temperature condition of 25° C. from N-trifluoromethansulfonyl N-phenyl benzamide, represented by Chemical formula 54 (No. 65).

[Chemical Formula 54]

The primary benzamide represented by Chemical Formula 2 was produced at a yield of 90% in the temperature condition of 25° C. from N-mesityl N-phenyl benzamide, represented by Chemical formula 55 (No. 66).

[Chemical Formula 55]

The primary benzamide represented by Chemical Formula 2 was produced at a yield of 11% in the temperature condition of 25° C. from N-Boc protected N-phenyl benzamide, represented by Chemical formula 56 (No. 67).

[Chemical Formula 56]

The primary benzamide represented by Chemical Formula 2 was produced at a yield of 69% in the temperature condition of 25° C. from N-benzoyl saccharin, represented by Chemical formula 57 (No. 68).

[Chemical Formula 57]

The primary benzamide represented by Chemical Formula 2 was produced at a yield of 89% in the temperature condition of 25° C. from N-benzoyl succinimide, represented by Chemical formula 58 (No. 69).

[Chemical Formula 58]

The primary benzamide represented by Chemical Formula 2 was produced at a yield of 57% in the temperature condition of 25° C. from N-benzoyl glutarimide, represented by Chemical formula 59 (No. 70).

[Chemical Formula 59]

The primary benzamide represented by Chemical Formula 2 was produced at a yield of 0% in the temperature condition of 25° C. from N-methyl N-phenyl benzamide, represented by Chemical formula 60 (No. 71). Even after the reaction was carried out for 16 hours in the temperature condition of 40° C., the yield was measured to be 0%.

[Chemical Formula 60]

The primary benzamide represented by Chemical Formula 2 was produced at a yield of 0% in the temperature condition of 25° C. from N,N-diphenyl benzamide, represented by Chemical formula 61 (No. 72). Even after the reaction was carried out for 16 hours in the temperature condition of 40° C., the yield was measured to be 0%.

[Chemical Formula 61]

Example 4. Transamidation of N-Tosyl Lactam

Referring to the optimal conditions, the reaction was performed at a reaction temperature of 40° C. for 16 to 36 hours, using 1.0 mmol of each of 1-tosylpyrrolidin-2-one, 1-tosylpiperidin-2-one and 1-Tosylazepan-2-one as substrates, 0.5 or 1.0 equivalent of ammonium carbonate

Figure 5A:
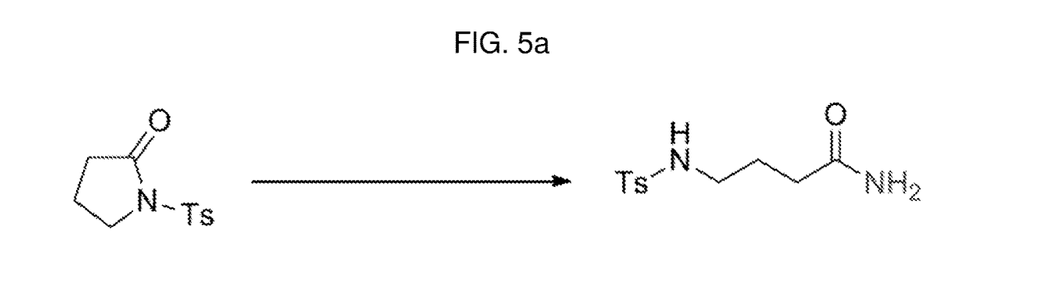
FIG. 5a is a reaction scheme of synthesizing a primary benzamide through transamidation of N-tosyl lactam, with 1-tosylpyrrolidin-2-one serving as a substrate, according to an embodiment of the present disclosure.
Figure 5B:
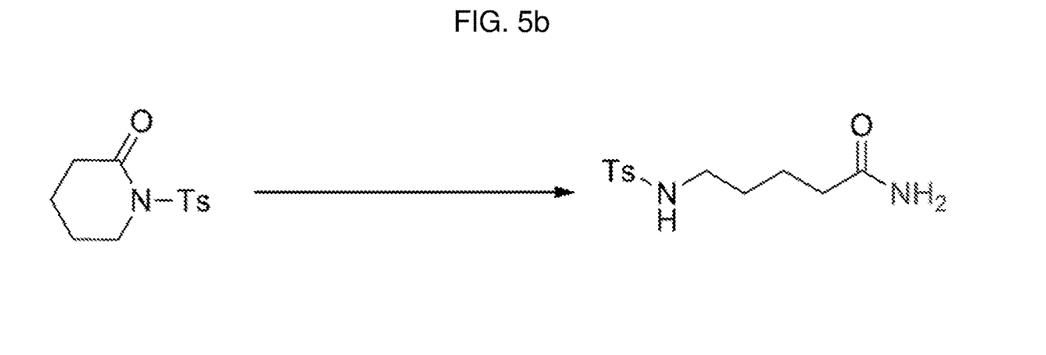
FIG. 5b is a reaction scheme of synthesizing a primary benzamide through transamidation of N-tosyl lactam, with 1-tosylpiperidin-2-one serving as a substrate, according to an embodiment of the present disclosure.
Figure 5C:
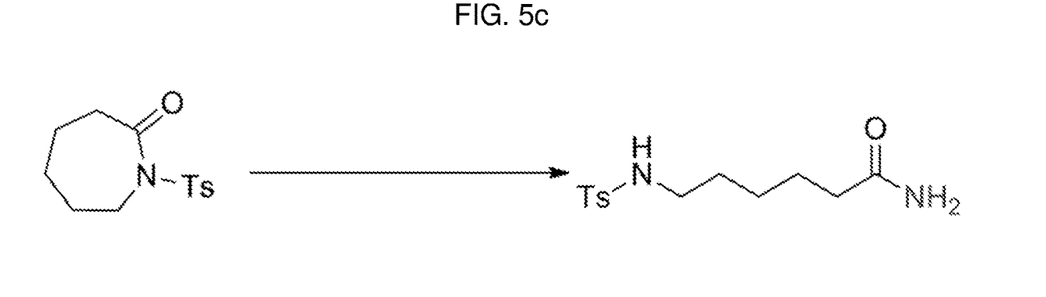
FIG. 5c is a reaction scheme of synthesizing a primary benzamide through transamidation of N-tosyl lactam, with 1-tosylazepan-2-one serving as a substrate, according to an embodiment of the present disclosure.

[(NH₄)₂CO₃] as an ammonia source, and DMSO as a solvent, to afford corresponding primary benzamides (see FIGS. 5a to 5c).

The yields of the products were measured by gas chromatography-mass spectrometry (GCMS) and are summarized as % in Table 4.

TABLE 4

| No. | Substrate | Yield (%) (40° C., 16 h) | Yield(%) (40° C., 36 h) |
|-----|-----------|--------------------------|-------------------------|
| 73  | 1-Tosylpyrrolidin-2-one | 48 | 50 |
| 74  | 1-Tosylpiperidin-2-one  | 80 | 90 |
| 75  | 1-Tosylazepan-2-one     | 36 | 50 |

As shown in Table 4, the product 4-(4-methylphenylsulfonamido)butanamide represented by Chemical Formula 62 was obtained at a yield of 48% from 1-tosylpyrrolidin-2-one after the reaction for 16 hours in the temperature condition of 40° C. (No. 73). The production yield increased to 50% when the reaction was carried out for 36 hours in the temperature condition of 40° C.

[Chemical Formula 62]

Chromatography and 1H NMR measured as follows: Mp: 132-133° C.; 1H NMR (500 MHz, DMSO-d6) δ 7.65 (d, J=8.2 Hz, 2H), 7.50 (s, 1H), 7.38 (d, J=8.2 Hz, 2H), 7.21 (s, 1H), 6.71 (s, 1H), 2.67 (t, J=7.2 Hz, 2H), 2.37 (s, 3H), 2.02 (t, J=7.4 Hz, 2H), 1.60-1.51 (m, 2H); 13C NMR (126 MHz, DMSO-d6) δ 174.1, 143.0, 138.0, 130.1, 126.9, 42.7, 32.5, 25.5, 21.4; HRMS (ESI-TOF) m/z: [M+Na]+ Calcd for C11H16N2O3SNa 279.0779; Found 279.0779.

The product 5-(4-methylphenylsulfonamido)pentanamide represented by Chemical Formula 63 was obtained at a yield of 80% from 1-tosylpiperidin-2-one after the reaction for 16 hours in the temperature condition of 40° C. (No. 74). The production yield increased to 90% when the reaction was carried out for 36 hours in the temperature condition of 40° C.

[Chemical Formula 63]

Chromatography and 1H NMR measured as follows: Mp: 130-131° C.; 1H NMR (500 MHz, DMSO-d6) δ 7.66 (d, J=8.2 Hz, 2H), 7.47 (s, 1H), 7.38 (d, J=8.2 Hz, 2H), 7.19 (s, 1H), 6.68 (s, 1H), 2.67 (t, J=7.0 Hz, 2H), 2.37 (s, 3H), 1.96 (t, J=7.3 Hz, 2H), 1.46-1.37 (m, 2H), 1.37-1.28 (m, 2H); 13C NMR (126 MHz, DMSO-d6) δ 174.4, 142.9, 138.1, 130.0, 126.9, 42.8, 34.9, 29.1, 22.7, 21.4; HRMS (ESI-TOF) m/z: [M+Na]+ Calcd for C12H18N2O3SNa 293.0936; Found 293.0936.

The product 6-(4-methylphenylsulfonamido)hexanamide represented by Chemical Formula 64 was obtained at a yield of 36% from 1-tosylazepan-2-one after the reaction for 16 hours in the temperature condition of 40° C. (No. 75). The production yield increased to 50% when the reaction was carried out for 36 hours in the temperature condition of 40° C.

[Chemical Formula 64]

Chromatography and 1H NMR measured as follows: Mp: 75-77° C.; 1H NMR (500 MHz, DMSO-d6) δ 7.65 (d, J=8.2 Hz, 2H), 7.46 (s, 1H), 7.38 (d, J=8.2 Hz, 2H), 7.19 (s, 1H), 6.66 (s, 1H), 2.66 (t, J=7.0 Hz, 2H), 2.37 (s, 3H), 1.96 (t, J=7.4 Hz, 2H), 1.42-1.29 (m, 4H), 1.21-1.12 (m, 2H). 13C NMR (126 MHz, DMSO-d6) δ 174.6, 142.9, 138.1, 130.0, 126.9, 42.9, 35.4, 29.2, 26.3, 25.1, 21.4.

As shown in Nos. 73 to 75, production yields of corresponding benzamides from 1-tosyl pyrrolidin-2-one, 1-tosyl piperidin-2-one, and 1-tosyl azepan-2-one increased with increasing of the reaction time.

INDUSTRIAL APPLICABILITY

The present disclosure is drawn a method for preparing primary amides and, specifically, to a method for preparation of primary amides from tertiary or secondary amides having various alkyl substituents through transamidation with ammonium carbonate [(NH₄)₂CO₃] in a room temperature condition without using a metal catalyst.

What is claimed is:

1. A method for preparing a primary amide, the method comprising a step of:
    subjecting a secondary or tertiary amide as a substrate to transamidation with an ammonia source in absence of a catalyst,
    wherein the ammonia source is at least one selected from the group consisting of ammonium acetate, ammonium formate, and ammonium carbonate,
    wherein the transamidation is carried out in a temperature condition of 20 to 45° C., and wherein the substrate is selected from the group consisting of N-4-methoxyphenyl-N-tosyl benzamide, N-4-fluorophenyl-N-tosylbenzamide, N-benzyl-N-tosylbenzamide, N-methyl-N-tosylbenzamide, N-trifluoromethanesulfonyl-N-phenylbenzamide, N-mesityl-N-phenylbenzamide, N-Boc protected N-phenyl benzamide, N-benzoyl saccharin, N-benzoylsuccinimide, N-benzoylglutarimide, N-methyl-N-phenyl benzamide, and N,N-diphenylbenzamide,
    or the substrate is selected from the group consisting of 1-tosylpyrrolidin-2-one, 1-tosylpiperidin-2-one, and 1-tosylazepan-2-one.

2. A method for preparing a primary benzamide, the method including a step of:
    subjecting N-phenyl-N-tosyl benzamide as a substrate to transamidation with an ammonia source in absence of a catalyst,
    wherein the ammonia source is at least one selected from the group consisting of ammonium acetate, ammonium formate, and ammonium carbonate,
    wherein the transamidation is carried out in a temperature condition of 20 to 45° C.

3. The method of claim 2, wherein the transamidation is carried out in at least one solvent selected from the group consisting of dimethyl sulfoxide and N, N-dimethylformamide.

4. The method of claim 2, wherein the transamidation is carried out in presence of at least one selected from the group consisting of 1,8-diazabicyclo [5.4.0] undec-7-ene (DBU), trisodium phosphate, and sodium carbonate in a solvent.

5. The method of claim 2, wherein the N-phenyl-N-tosyl benzamide and the ammonia source are used at an equivalent ratio of 5:2 to 5:11.

6. The method of claim 2, wherein the transamidation is carried out for 4 to 18 hours.

7. A method for preparing a benzamide, the method including a step of:

subjecting substituted N-phenyl-N-tosyl benzamide as a substrate to transamidation with an ammonia source in absence of a catalyst,
wherein the ammonia source is at least one selected from the group consisting of ammonium acetate, ammonium formate, and ammonium carbonate,
wherein the transamidation is carried out in a temperature condition of 20 to 45° C.

8. The method of claim 7, wherein the ammonia source is ammonium carbonate.

9. The method of claim 7, wherein the N-phenyl-N-tosyl benzamide and the ammonia source are used at an equivalent ratio of 5:2 to 5:11.

10. The method of claim 7, wherein the transamidation is carried out using dimethyl sulfoxide as a solvent.

11. The method of claim 7, wherein the transamidation is carried out for 4 to 140 hours.

* * * * *